Figures 1, 2, 3:
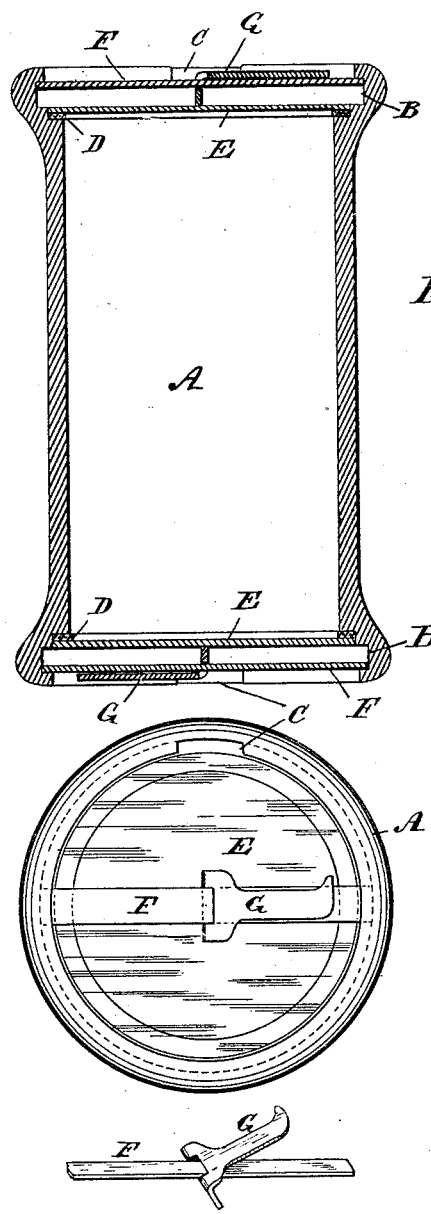

(No Model.)

O. GEROW.
FRUIT JAR.

No. 342,250. Patented May 18, 1886.

Witnesses:
John Grist
C. G. Pennock

Inventor:
O. Gerow
By Henry Grist
Attorney.

UNITED STATES PATENT OFFICE.

ORR GEROW, OF BROCKVILLE, ONTARIO, CANADA.

FRUIT-JAR.

SPECIFICATION forming part of Letters Patent No. 342,250, dated May 18, 1886.

Application filed March 15, 1886. Serial No. 195,278. (No model.)

*To all whom it may concern:*

Be it known that I, ORR GEROW, of the town of Brockville, in the Province of Ontario, in the Dominion of Canada, have invented certain new and useful Improvements in Fruit-Jars; and I do hereby declare that the following is a full, clear, and exact description of the same, reference being had to the annexed drawings, in which—

Figure 1 is a longitudinal section of my improved jar. Fig. 2 is an elevation of the ends of the jar, and Fig. 3 is a perspective view of the cross-bar and lever removed from the jar.

My invention consists of a tubular jar, the ends of which are closed by inserted glass covers pressed by a cam-lever sleeved on a cross-bar bearing in a peripheral groove notched to admit the bar, whereby both covers of the jar are removable to allow the jar to be readily cleaned internally before use, and the contents are preserved by the tight-fitting covers.

A is a tubular jar, preferably cylindrical and preferably made of stone-ware. The wall of the tube at both ends is increased in thickness outwardly, and has internally peripheral grooves B B and notches C C from the grooves to the ends of the jar.

D D are rubber rings placed on annular seats concentric with the grooves B B, and E E are glass disk-covers bearing against the rings to close both ends of the jar.

F F are bars diametrically crossing the covers E and inserted into the grooves B B of the jar by placing one end in the groove, then passing the other end through the notch C, and rotating the bar.

G G are cam-levers having a slot to sleeve on bar F, and bent at the slot to a right angle to depress the disk-cover E on the rubber ring to make a tight joint when the lever is depressed against bar F. The lower part of the lever being then at right angles to the cover bar F will prevent it from rising, and the lever will be flush with or below the peripheral rim of the jar, thereby protecting the lever from accidental operation, and allowing the jars to be piled end upon end and be compactly stowed for transportation.

The bar F should have sufficient elasticity to accommodate over-pressure on the lever, and thus prevent breakage.

Having thus described my invention, what I claim as new, and desire to secure by Letters Patent, is—

A fruit or preserving jar, A, having internally a peripheral groove, B, notch C, and annular seat D, in combination with a cover, E, cross-bar F, and cam-lever G, as set forth.

ORR GEROW.

Witnesses:
C. G. PENNOCK,
JOHN GRIST.